United States Patent [19]
Lane et al.

[11] Patent Number: 5,522,218
[45] Date of Patent: Jun. 4, 1996

[54] COMBUSTION EXHAUST PURIFICATION SYSTEM AND METHOD

[75] Inventors: William H. Lane, Chillicothe; Randy N. Peterson, Peoria; Aaron L. Smith; Scott T. White, both of East Peoria; Daniel J. Learned, Peoria, all of Ill.

[73] Assignee: Caterpillar Inc., Peoria, Ill.

[21] Appl. No.: 294,677

[22] Filed: Aug. 23, 1994

[51] Int. Cl.$^6$ ................................................ F01N 3/20
[52] U.S. Cl. .......................... 60/274; 60/286; 60/289; 60/301; 60/303
[58] Field of Search ..................... 60/274, 286, 301, 60/303, 289

[56] References Cited

U.S. PATENT DOCUMENTS

| | | | |
|---|---|---|---|
| 3,696,618 | 10/1972 | Boyd | 60/301 |
| 3,768,259 | 10/1973 | Carnahan | 60/276 |
| 3,945,204 | 3/1976 | Knapp | 60/301 |
| 3,962,867 | 6/1976 | Ikeura | 60/290 |
| 4,452,040 | 6/1984 | Kobashi | 60/274 |
| 4,541,239 | 9/1985 | Tokura et al. | 60/286 |
| 4,617,793 | 10/1986 | Suzuki et al. | 60/285 |
| 4,662,172 | 5/1987 | Shinzawa et al. | 60/303 |
| 4,991,396 | 2/1991 | Goerlich et al. | 60/303 |
| 5,021,227 | 6/1991 | Kobayashi et al. | 423/212 |
| 5,070,833 | 12/1991 | Matsuoka | 123/270 |
| 5,081,970 | 1/1992 | Matsuoka | 123/275 |
| 5,142,864 | 9/1992 | Dunne | 60/274 |
| 5,189,876 | 3/1993 | Hirota et al. | 60/286 |
| 5,193,340 | 3/1993 | Kamihara | 60/286 |
| 5,201,300 | 4/1993 | Iiyama | 123/569 |
| 5,209,061 | 5/1993 | Takeshima | 60/278 |
| 5,218,824 | 6/1993 | Cederwall et al. | 60/737 |

*Primary Examiner*—Douglas Hart
*Attorney, Agent, or Firm*—Liell & McNeil

[57] ABSTRACT

The present invention is particularly well suited for purifying exhaust from relatively large lean burn diesel engines. A computer controlled injector intermittently injects an optimal amount of NOx reducing fluid into the exhaust passageway from the engine. The optimal amount corresponds to an amount that will achieve optimal NOx reduction rates for the given engine operating condition and exhaust temperature. A computer periodically senses the engine operating condition and the exhaust temperature, and calculates the appropriate injection amount. With appropriate deNOx and oxidation catalysts located downstream from the injector, the exhaust purification system of the present invention has the ability to greatly reduce NOx content of the exhaust while maintaining HC emissions at acceptable levels.

20 Claims, 5 Drawing Sheets

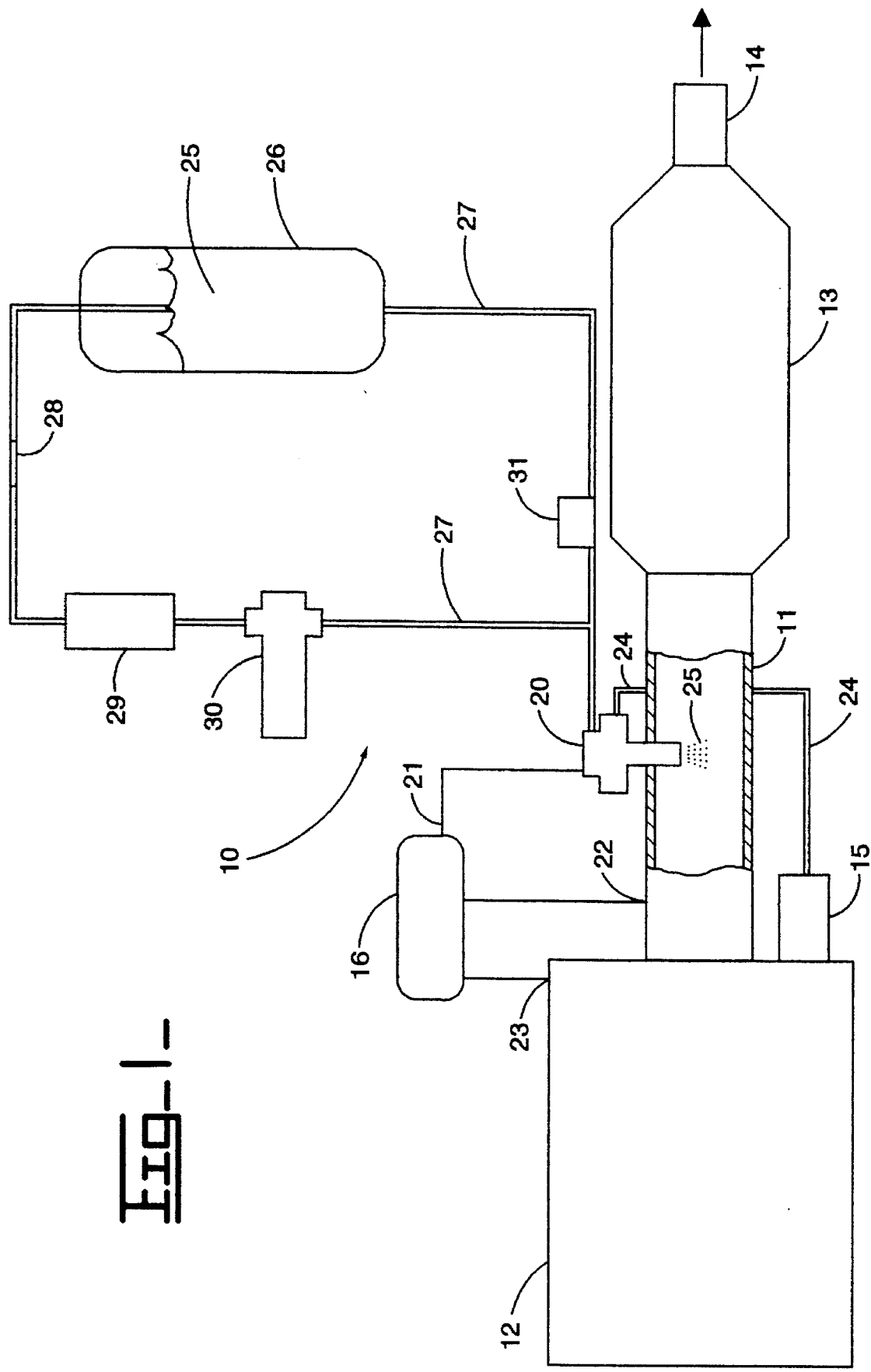

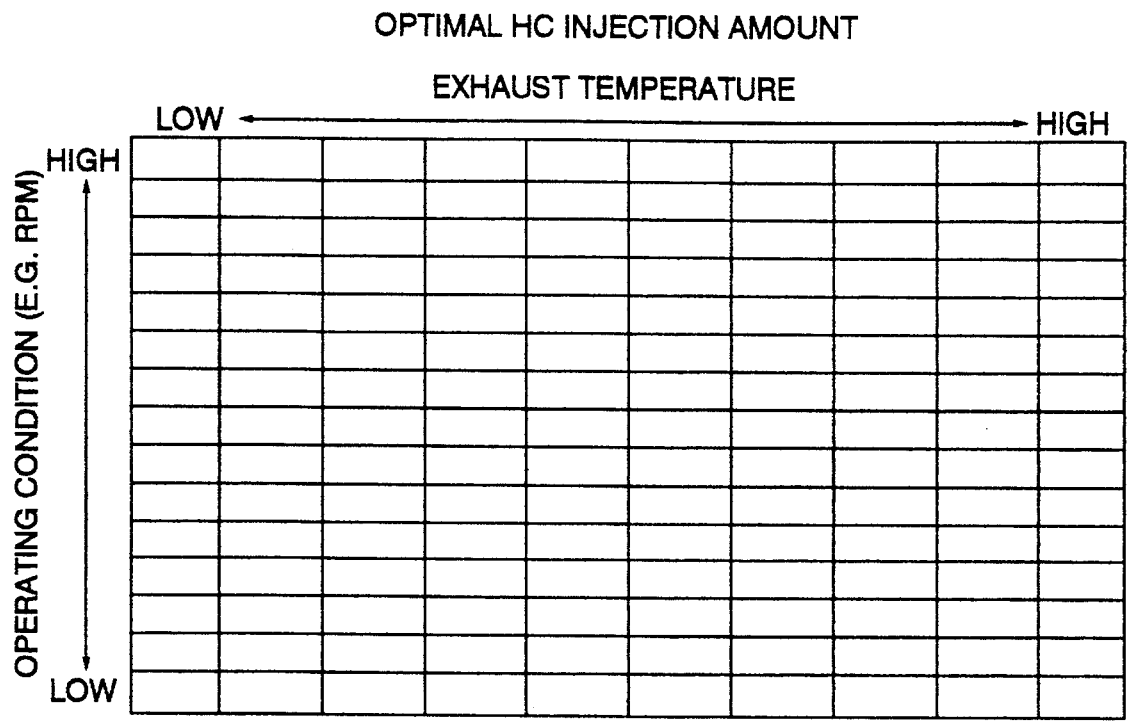
Fig_2_
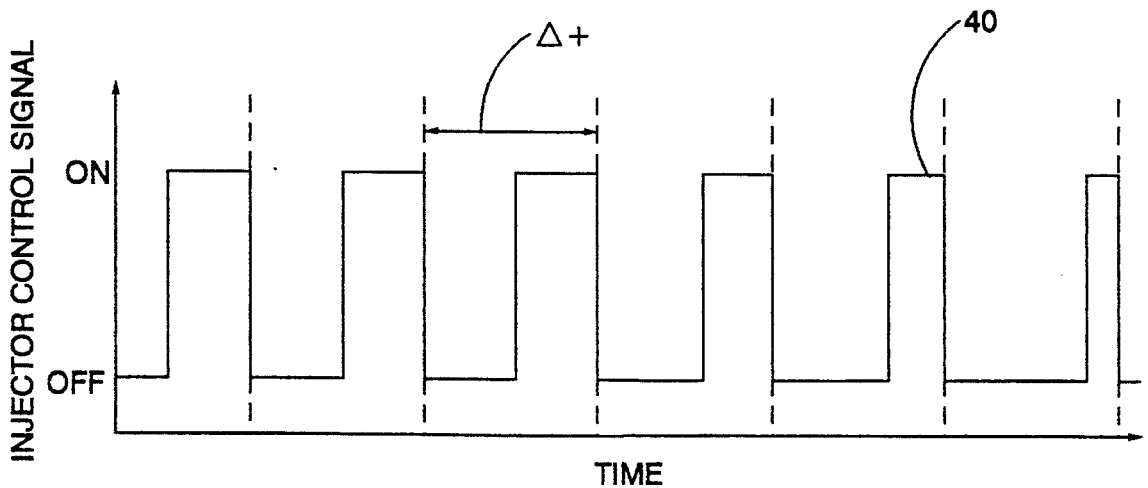
Fig_3_

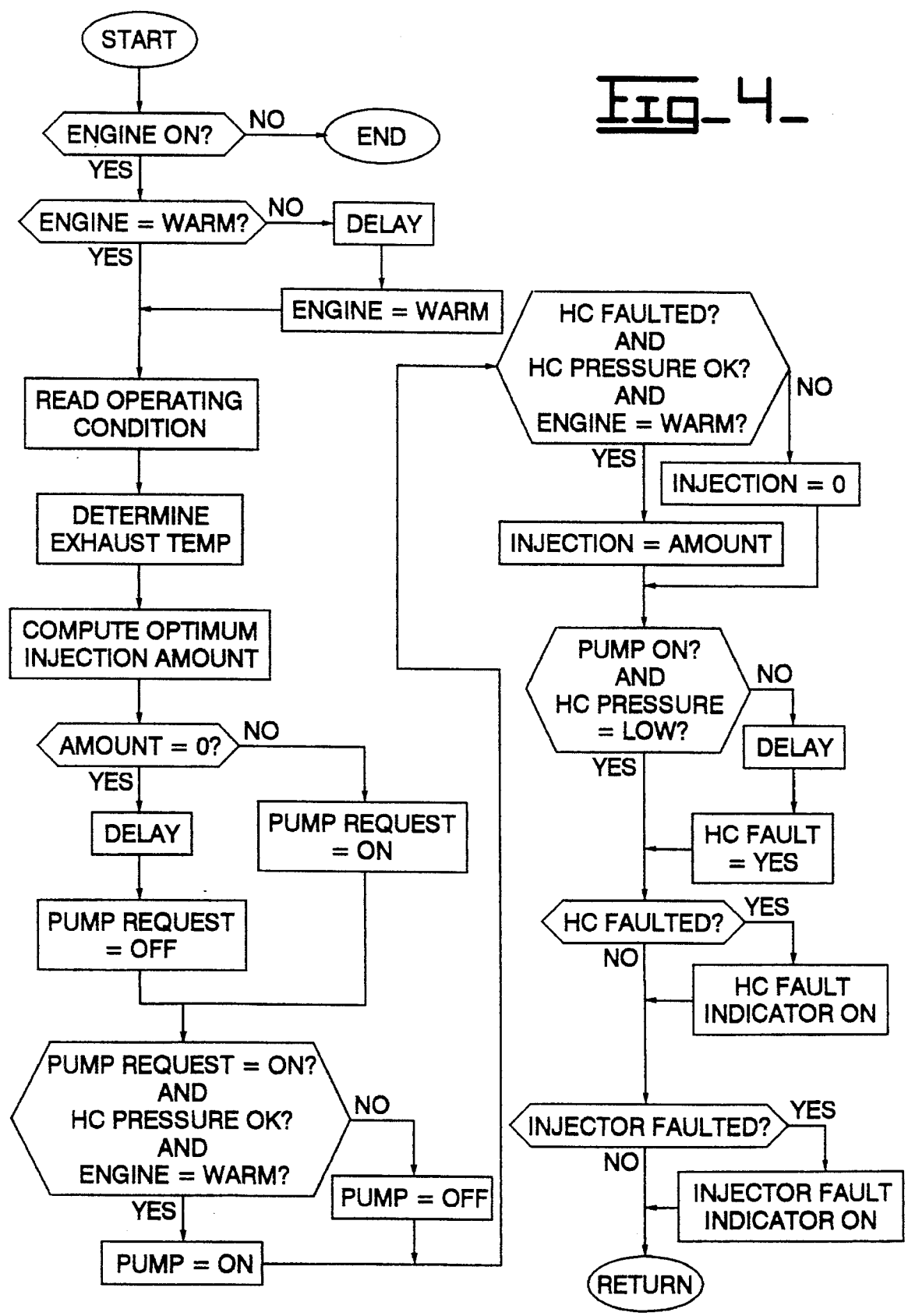
Fig_4_

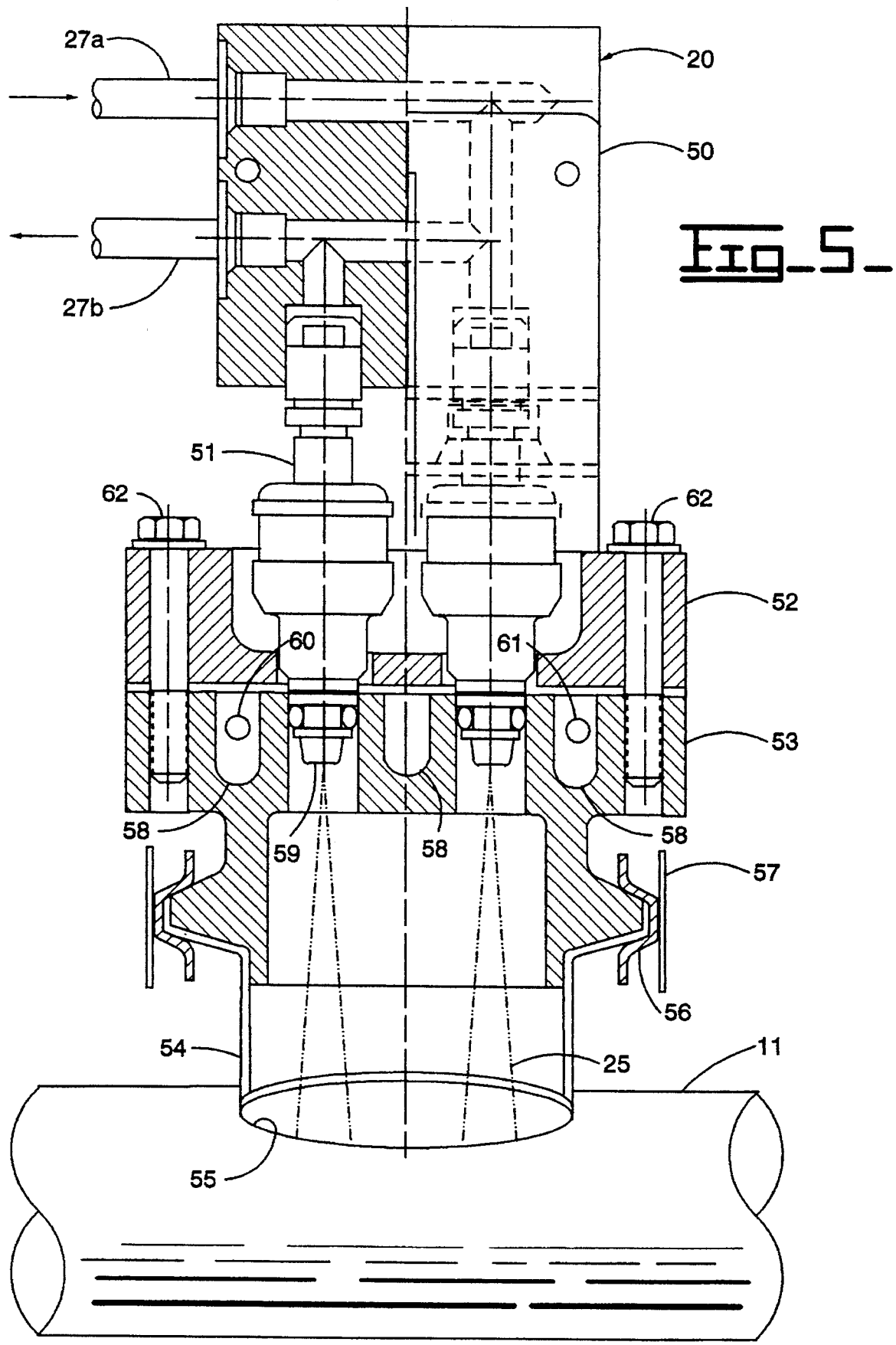
Fig_5_

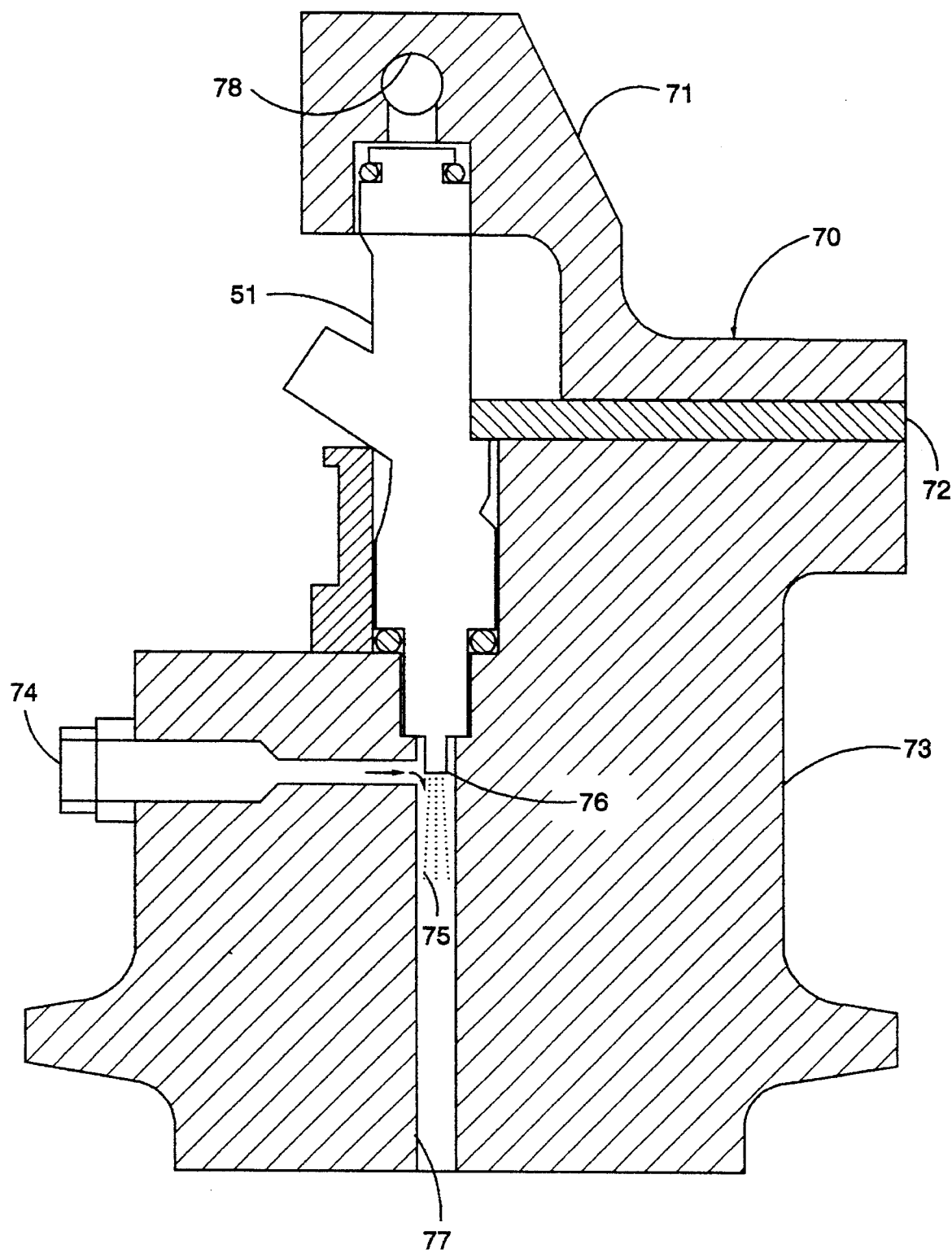
Fig_b_

COMBUSTION EXHAUST PURIFICATION SYSTEM AND METHOD

TECHNICAL FIELD

The present invention relates generally to combustion exhaust purification systems, and more particularly to a high temperature NOx reduction system for exhaust from lean burn engines.

BACKGROUND OF THE INVENTION

Due to primarily federal regulations, engine manufacturers are being forced to reduce the amount of harmful compounds in the combustion exhaust. In the case of lean burning engines—including diesel and certain spark igniting engines—a hydrocarbon (HC) species must often be injected into the exhaust to effectively reduce the NOx concentrations. In other words, in combustion exhaust purification systems having an oxygen environment above 3% concentration, some type of reducing agent, usually a hydrocarbon compound, must be introduced into the exhaust in order to achieve acceptable reduction levels of NOx compounds. The HC may be introduced in many ways, but typically is continuously injected into the exhaust upstream from an appropriate deNOx catalytic converter. Unfortunately, in many real world applications, a continuous introduction of HC into the exhaust is not always the most practical. Continuous injection systems oftentimes also typically have great difficulty performing satisfactorily across the complete operating range of the engine. In addition, these continuous systems are often poorly suited for control by today's digital engine control systems.

What is needed is an exhaust gas purification system that is easily controlled, performs effectively across a complete operating range of the engine, and achieves satisfactory reduction of NOx compounds in the exhaust.

SUMMARY OF THE INVENTION

In responding to this need, one embodiment of the invention comprises a method of reducing NOx content in combustion exhaust from a combustion source flowing through an exhaust passageway. The method includes the initial step of predetermining optimal amounts for the injection of a NOx reducing fluid over a portion of the operating range of the combustion source and over a range of exhaust temperatures. The optimal amount being that amount which achieves the greatest reduction of NOx at a particular combination of combustion source (e.g. engine) operating condition and exhaust temperature. A deNOx catalyst is positioned in the exhaust passageway. When in operation, the temperature of the exhaust is periodically measured and the operating condition of the combustion source is periodically determined. An injection amount is periodically computed based upon predetermined optimal amounts, the measured temperature of the exhaust, and the determined operating condition of the combustion source. Finally, the injection amount of NOx reducing fluid is periodically injected into the exhaust passageway upstream from the deNOx catalyst.

The system embodiment of the invention comprises an exhaust passageway having one end connected to a combustion exhaust source. A deNOx catalyst is positioned in the exhaust passageway, and an injector is mounted on the exhaust passageway upstream from the deNOx catalyst. The injector has the capability of periodically injecting an amount of a NOx reducing fluid into the exhaust passageway. A tank holding NOx reducing fluid is connected via a pipe to the injector. Some means is provided for determining the operating condition of the combustion source, and some means is provided for measuring the temperature of the exhaust in the exhaust passageway. Finally, a computer maintains communication with the operating condition determining means, the temperature measuring means, and the injector. The computer has the ability to control the injector.

Engineers have long known that the constituent compounds of combustion exhaust vary widely over the operating range of a particular engine, and the reactability of these compounds for purification varies significantly depending upon the temperature of the exhaust. As a consequence, most exhaust purification systems that utilize the injection of HC into the exhaust to reduce NOx compounds are typically designed for optimal performance over the limited range of exhaust temperatures. In other words, little or none of today's exhaust gas purification systems have the ability to operate effectively throughout the engine's operating range and over a wide range of exhaust temperatures. The present invention is based upon the assumption that a properly controlled HC injection exhaust gas purification system can achieve significant NOx reduction over an engine's complete operating range and over the majority of the exhaust temperature range.

One object of the present invention is to improve NOx reduction across the complete operating range of a combustion source.

Another objection of the present invention is to improve exhaust purification in lean burn engines.

Still another object of the present invention is to achieve optimal NOx reduction over a range of exhaust temperatures.

Still another object of the present invention is an improved combustion exhaust purification system and method.

BRIEF DESCRIPTION OF THE DRAWINGS

FIG. 1 is a schematic illustration of a combustion exhaust purification system according to the preferred embodiment of the present invention.

FIG. 2 is an empirical table of optimal HC injection amounts over a range of operating conditions exhaust temperatures.

FIG. 3 is a graph of an injector control signal versus time for an intermittent injector according to one aspect of the present invention.

FIG. 4 is a block diagram illustrating the preferred software control logic for the present invention.

FIG. 5 is a partially sectioned front elevational view of a liquid cooled injector and housing block according to one aspect of the present invention.

FIG. 6 is a sectioned front elevational view of an air mixing injector according to another aspect of the present invention.

DETAILED DESCRIPTION OF PREFERRED EMBODIMENTS

Referring now to FIG. 1, an exhaust gas purification system 10 according to the preferred embodiment of the present invention is shown in use with an internal combustion engine 12. At present, the invention finds its best application in relation to lean burn diesel engines, such as Caterpillar 3500 series diesel engines. Exhaust exits engine 12 via exhaust passageway 11 on its way to catalytic converter 13 and eventually exits at outlet 14. Catalytic converter 13 includes a deNOx catalyst, such as zeolite ZSM5 or a precious metal based catalyst, or a combination of both. In many applications it may also be desirable to include an oxidation catalyst of a type known in the art downstream from the deNOx catalyst. In the preferred embodiment for a lean burn diesel engine, the inclusion of a three way catalyst between the deNOx and oxidation catalyst may effectively increase reduction of undesirable nitrogen compounds present after the exhaust passes through the deNOx catalyst. As exhaust leaves engine 12, an amount of HC 25 is injected into exhaust passageway 11 via injector 20. This additional HC allows reduction of upwards of 80% of the NOx compounds after passage through the deNOx catalyst. Next, the exhaust encounters the oxidation catalyst (not shown) which serves to purify the exhaust of most of the remaining unburned HC. The exhaust exiting outlet 14 has greatly reduced NOx content while also achieving satisfactory levels of HC emission.

Because temperatures in a diesel exhaust environment can reach 650° C. without failure, the engine's cooling system 15 circulates coolant via pipe 24 to continuously cool injector 20. The injector 20 is designed to have the ability to introduce an optimal amount of HC 25, which is dependent upon the exhaust temperature and the operating condition of engine 12. The term optimal amount means that amount which will produce the greatest overall NOx reduction for a given exhaust temperature and operating condition without unnecessarily increasing the amount of HC being injected. This is accomplished by utilizing a computer 16 that has the ability to control injector 20 via connection 21. Computer 16 periodically determines the exhaust temperature via temperature sensor 22, and monitors the operating condition of engine 12 via sensor 23. In motor vehicle applications, it may be desirable for computer 16 to periodically determine the operating condition of the complete vehicle, such as engine rpm, transmission gear and vehicle speed. These additional sensors would be desirable in those cases where exhaust gas purification was shown to be sensitive to the vehicle's operating conditions as well as the particular engine's operating conditions.

HC 25, which is preferably ethanol but could be any suitable NOx reducing fluid known in the art, is stored in tank 26 and carried to injector 20 via pipe 27. A pump 30 serves to pressurize pipe 27 while pressure regulator 31 maintains the fluid pressure on injector 20 at a predetermined level. HC 25 passes through filters 28 and 29 on its way to injector 20, with a portion being recirculated through regulator 31 back to tank 26 when system 10 is in operation.

Although it is known that the NOx content of the exhaust is a strong function of an engine's operating condition, the relationship of these two variables varies between engine configurations and can be very unpredictable. Furthermore, the chemical reactions resulting in NOx reduction are sensitive to exhaust temperature, but this relationship is also non-linear and not satisfactorily predictable with today's modeling tools. As a result, in the preferred embodiment of the present invention, empirical data for a given engine configuration is acquired for subsequent storage in a memory location within computer 16. In other words, an optimal HC injection amount can be determined empirically for a given system at a plurality of engine operating conditions and over a range of exhaust temperatures. An example of such an empirical table is illustrated in FIG. 2. Each element of the table includes an optimal HC injection amount for a specific operating condition and exhaust temperature. Thus, with relatively simple software, computer 16 can periodically adjust the injection amount of injector 20 to correspond to an optimal injection amount based upon the sensed exhaust temperature and engine operating condition.

In the preferred embodiment, injector 20 is an intermittent injector having only two operating conditions, on or off. However, because pressure regulator 31 maintains HC 25 at a constant pressure on injector 20, the mass flow rate of HC 25 from injector 22 is a known constant. The frequency of the injector is selected as a trade off between optimal conversion efficiency and injector life. Higher frequency injection would lead to better conversion efficiency, but the increased number of injector cycles will result in shorter injector life. At present, injector frequencies of at least one hertz have been found to be preferable.

FIG. 3 shows an exaggerated example of an injector control signal for an intermittent injector 20 operating on an injector cycle time period of $\Delta t$. Because the mass flow rate of the injector is constant, the amount of HC injected into the exhaust over any given time period $\Delta t$ is simply a function of how long the injector remained on over that time period. FIG. 3 is said to be exaggerated since it is not likely that the injector on-time 40 would vary as quickly as that shown in the graph. In a real world application, the injector on-time would only change if the computer sensed a change in engine operating condition or exhaust temperature. In the preferred embodiment, the empirical data from the table of FIG. 2 is converted into injector on-time increments corresponding for each injector cycle. In this way, the computer simply senses the engine's operating condition, measures the exhaust temperature, and determines an optimal injection on-time from the table stored in computer memory. The computer then commands the injector to be on over the next injector cycle for the time period read from the optimal injection amount table.

In some applications it may be desirable to convert the empirical data into curve fit equations that are utilized by the computer as an alternative to a "look-up" table, as previously described. In such a case, the injector on-time would be calculated via the curve fit function utilizing the sensed engine operating condition and exhaust temperature. Although the present invention is illustrated in use with an intermittent injector, it should be clear to those skilled in the art that a continuous injector with the ability to vary its mass flow rate could also be utilized in accordance with the present invention.

FIG. 4 shows an example software block diagram for controlling the HC injector. As a first step, the computer ascertains whether the engine is on and whether it is warm. If the engine is not yet warm, the computer delays the activation of the injector for a time period that will allow the engine to warm up. Next, the computer reads the engine operating condition from the engine sensor 23 (see FIG. 1), reads the exhaust temperature from temperature sensor 22 and computes the optimal injection amount as discussed above. Next, if the injection amount is greater than zero, the pump request flag is activated. If the pump request flag is on, the HC pressure is okay and the engine is warm, the computer will command pump 30 to turn on. If the HC subsystem is not faulted, the HC pressure is okay and the engine is warm, the computer commands the injector to inject the optimal amount. Finally, if either the HC supply system or the injector has malfunctioned, the appropriate internal computer flags and external indicators are activated in order to alert an attendant that the exhaust purification system is in need of maintenance. The software then repeats itself. It should be noted that the computation cycle is likely significantly faster than the injector cycle. Therefore, the commanded optimal injection amount would be averaged over a number of computation cycles corresponding to a single injector cycle.

Referring now to FIG. 5, a liquid cooled injector 20 according to one embodiment of the present invention is illustrated. Injector 20 consists essentially of a NOx reducing fluid supply head 50, a plurality of conventional automotive type injectors 51 and an injector block 52. HC is supplied via pipe 27a to head 50 and is recirculated back to the HC supply tank via recirculating pipe 27b. Injectors 51 are conventional intermittent automotive type injectors except for the inclusion of a high temperature injector tip in place of the standard injector tip and the addition of a special high temperature shield 59, both of which protect the injector tip from the high temperatures encountered in diesel exhaust. In one specific preferred embodiment, shield 59 is constructed of a mild steel and the replacement high temperature tip is constructed of a high temperature plastic. Injector heat shields 59 are preferably machined into the injector block or, alternately, are machined as a separate component which is then pressed or welded into the injector bore.

Injector block 52 is assembled via bolts 62 with a lower portion 53. Lower portion 53 is mated to supply pipe 54 via annular bracket 56 and tube clamp 57. Supply pipe 54 opens into exhaust passageway 11 at opening 55. It is important to note that coolant fluid is circulated around annular chambers 58. Coolant is supplied via inlet 61, circulates around the injector tips and then exits back to the engine's cooling system via outlet 60. The combination of fluid cooling of injector block 52 and injector tip heat shields 59 allows the use of conventional automotive type injectors in the high temperature exhaust environment of a diesel engine.

FIG. 6 shows an alternative injector design 70 that utilizes air mixing to maintain injector tip 76 at an acceptable temperature. Like the earlier embodiment, injector 70 includes a NOx reducing fluid supply head 71 which continuously circulates pressurized NOx reducing fluid to automotive type injector 51 via internal supply tube 78. Head portion 71 is mated to a lower block portion 73 in a conventional manner, such as bolts, but are separated by a gasket 72. As in the previous embodiment, automotive injector 51 is of a type well known in the art; however, no protective heat shield or replacement tip is utilized in this embodiment since relatively cool air continuously passes over injector tip 76 from air supply nozzle 74. A mixture 75 of HC and air is then supplied to the exhaust passageway (not shown) via injection supply conduit 77. The HC is preferably injected perpendicular or in a downstream direction with respect to the exhaust flow in order to prevent potential clogging problems.

It should be understood that only the preferred embodiments have been shown and described, and that many other different embodiments come within the contemplated scope of the present invention. For instance, a continuous injector could be substituted for the intermittent injector described above with appropriate software changes, and many different NOx reducing fluids known in the art could be substituted and successfully utilized in place of the ethanol suggested above. In any event, the above embodiments are merely examples of the present invention, and the full legal scope of the invention is defined solely with respect to the claims set forth below.

We claim:

1. A combustion exhaust purification system comprising:
   an exhaust passageway having one end connected to a combustion exhaust source;
   a deNOx catalyst positioned in said exhaust passageway;
   an injector with two operating states mounted on said exhaust passageway upstream from said deNOx catalyst;
   said two operating states including an open operating state in which a NOx reducing fluid is injected into said exhaust passageway and a closed operating state in which no NOx reducing fluid is injected into said exhaust passageway;
   a tank capable of holding the NOx reducing fluid;
   a pipe connected between said injector and said tank and being capable of carrying the NOx reducing fluid from said tank to said injector;
   means for determining the operating condition of the combustion exhaust source;
   means for measuring the temperature of the exhaust in said exhaust passageway; and
   a computer in communication with said determining means, said measuring means and said injector, and being capable of controlling said operating state of said injector to intermittently inject said NOx reducing fluid into said exhaust passageway.

2. The combustion exhaust purification system of claim 1 further comprising means, attached to said pipe, for pressurizing the NOx reducing fluid in said pipe.

3. The combustion exhaust purification system of claim 2 wherein said injector has only two operating states, an open operating state and a closed operating state;
   said computer controls the amount of time said injector is in said open operating state and in said closed operating state during each injector cycle so that a predetermined amount of said NOx reducing fluid is injected in each said injector cycle; and
   the system further comprises means for maintaining said injector at a substantially fixed mass flow rate when in said open operating state.

4. The combustion exhaust purification system of claim 3 wherein said maintaining means includes an injector supply pressure regulator attached to said pipe.

5. The combustion exhaust purification system of claim 3 wherein said injector cycle is at least one hertz.

6. The combustion exhaust purification system of claim 3 further comprising means for mixing the NOx reducing fluid with air before entering said exhaust passageway.

7. The combustion exhaust purification system of claim 3 wherein the NOx reducing fluid is ethanol.

8. A combustion exhaust purification system comprising:
   an exhaust passageway having one end connected to a combustion exhaust source:
   a deNOx catalyst positioned in said exhaust passageway;
   an injector mounted on said exhaust passageway upstream from said deNOx catalyst and being capable of injecting an amount of a NOx reducing fluid into said exhaust passageway;
   a tank capable of holding the NOx reducing fluid;
   a pipe connected between said injector and said tank and being capable of carrying the NOx reducing fluid from said tank to said injector;
   means for determining the operating condition of the combustion exhaust source:
   means for measuring the temperature of the exhaust in said exhaust passageway;
   a computer in communication with said determining means, said measuring means and said injector, and being capable of controlling said injector;

means, attached to said pipe, for pressurizing the NOx reducing fluid in said pipe:

wherein said injector has only two operating states, an open operating state and a closed operating state;

said computer controls the amount of time said injector is in said open operating state and in said closed operating state during each injector cycle;

means for maintaining said injector at a substantially fixed mass flow rate when in said open operating state;

wherein said injector includes an injector block; and the system further comprises means for circulating a coolant fluid into contact with said injector block.

9. A method of reducing NOx content of combustion exhaust from an engine flowing through an exhaust passageway using an exhaust purification system, comprising the steps of:

predetermining optimal amounts for the injection of a NOx reducing fluid over a portion of the operating range of the engine and over a range of exhaust temperatures;

positioning a deNOx catalyst in the exhaust passageway;

measuring the temperature of the exhaust;

determining the operating condition of the engine;

determining whether the engine is warm;

computing an injection amount for a subsequent injector cycle time period based upon the predetermined optimal amounts, the measured temperature of the exhaust, and the determined operating condition of the engine; and determining whether a portion of said exhaust purification system has malfunctioned;

injecting the injection amount of the NOx reducing fluid into the exhaust passageway upstream from the deNOx catalyst if the engine is warm and the injection system is not malfunctioning; and cooling a portion of said exhaust purification system.

10. The NOx reducing method of claim 9 wherein said optimal amounts are predetermined empirically for a given combustion source.

11. The NOx reducing method of claim 10 further comprising the step of:

storing the predetermined optimal amounts in a memory location accessible to a computer that performs said computing step.

12. The NOx reducing method of claim 11 wherein said computing step includes the steps of:

accessing said memory location;

choosing which optimal amount corresponds most closely to the measured temperature of the exhaust and the determined operating condition of the combustion source; and controlling the operating state of the injector during said injecting step to deliver about the chosen optimal amount of NOx reducing fluid into the exhaust over said subsequent injector cycle time period.

13. The NOx reducing method of claim 12 wherein the injector has only two operating states, an open operating state in which the NOx reducing fluid is injected at a substantially fixed mass flow rate and a closed operating state in which no NOx reducing fluid is injected; and said computing step further includes the step of calculating the amount of time that the injector should be in said open operating state over said subsequent injector cycle time period in order to deliver the chosen optimal amount of the NOx reducing fluid to the exhaust passageway.

14. The combustion exhaust purification system of claim 2 wherein said injector includes a nozzle tip; and the system further comprising means for shielding said nozzle tip from heat in said exhaust passageway.

15. The combustion exhaust purification system of claim 2 wherein said injector includes a nozzle tip; and the system further comprising means for cooling said nozzle tip.

16. The combustion exhaust purification system of claim 15 wherein said means for cooling includes an injector block within which said injector is mounted; and means for circulating a cooling fluid through said block.

17. The combustion exhaust purification system of claim 15 wherein said means for cooling includes means for passing cool air over said nozzle tip.

18. The combustion exhaust purification system of claim 2 further comprising an oxidation catalyst mounted in said exhaust passageway downstream of said deNOx catalyst.

19. The combustion exhaust purification system of claim 18 further comprising a three way catalyst mounted in said exhaust passageway between said deNOx catalyst and said oxidation catalyst.

20. The combustion exhaust purification system of claim 2 wherein said injector is a conventional intermittent automotive type fuel injector.

\* \* \* \* \*